US012722420B2

(12) United States Patent
Shahin

(10) Patent No.: US 12,722,420 B2
(45) Date of Patent: Sep. 1, 2026

(54) ASSEMBLY FOR VEHICLE DRIVING DEVICE

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 331 days.

(21) Appl. No.: 18/385,090

(22) Filed: Oct. 30, 2023

(65) Prior Publication Data

US 2024/0408912 A1 Dec. 12, 2024

(30) Foreign Application Priority Data

Jun. 12, 2023 (DE) ........................ 102023115202.5

(51) Int. Cl.
*B60B 27/00* (2006.01)
*B60B 27/06* (2006.01)

(52) U.S. Cl.
CPC ........ *B60B 27/0052* (2013.01); *B60B 27/065* (2013.01)

(58) Field of Classification Search
CPC .... B60B 27/0052; B60B 27/065; B60B 27/06
See application file for complete search history.

(56) References Cited

U.S. PATENT DOCUMENTS

| | | | |
|---|---|---|---|
| 651,276 A | 6/1900 | Sendelbach | |
| 9,950,565 B2 * | 4/2018 | Pomp | B60B 27/065 |
| 11,565,546 B2 * | 1/2023 | von Chappuis | B60B 27/0052 |

FOREIGN PATENT DOCUMENTS

| | | |
|---|---|---|
| DE | 4205579 | 8/1993 |
| DE | 4419198 | 12/1994 |
| DE | 10 2013 004 613 B3 | 7/2014 |
| DE | 102016213962 | 2/2018 |
| JP | 2002-087007 A | 3/2002 |
| KR | 10-1965816 B1 | 4/2019 |

OTHER PUBLICATIONS

German Patent Office Application No. 102023115202.5, Office Action dated Apr. 22, 2024, 11 pages.

* cited by examiner

*Primary Examiner* — Jason R Bellinger
(74) *Attorney, Agent, or Firm* — LEE, HONG, DEGERMAN, KANG & WAIMEY

(57) ABSTRACT

An assembly for a vehicle driving device includes a hub configured to rotate about a rotary axis and one or more first fastening members configured to couple the hub and a rim of a wheel for a vehicle, wherein one end portion of the hub includes a first facing surface facing one surface of the rim, wherein the first facing surface includes a portion having an inclination angle with respect to the rotary axis, and the first fastening member is inserted into one portion of the one surface of the rim facing the portion having the inclination angle of the first facing surface and the portion having the inclination angle of the first facing surface in a perpendicular direction to couple the hub and the rim.

20 Claims, 8 Drawing Sheets

--PRIOR ART--

FIG. 2

--PRIOR ART--

--PRIOR ART--

--PRIOR ART--

--PRIOR ART--

--PRIOR ART--

ASSEMBLY FOR VEHICLE DRIVING DEVICE

CROSS-REFERENCE TO RELATED APPLICATION

This application claims the benefit of Germany Patent Application No. 102023115202.5, filed on Jun. 12, 2023, which is hereby incorporated by reference for all purposes as if fully set forth herein.

BACKGROUND

1. Field

Embodiments of the present disclosure relate to an assembly for a vehicle driving device, more specifically, to an assembly of a hub of an axle, a disc of a brake device, and a wheel.

2. Description of the Related Art

There has been a problem of noise generated around the brake device of a traveling vehicle.

For example, the noise may be low-frequency noise in the range of 100 Hz to 1000 Hz (for example, a moan noise, groan noise, and/or howl noise), intermediate-frequency noise in the range of 1 KHz to 5 KHz (for example, a squeal noise), and/or high-frequency noise in the range of 5 KHz to 10 KHz (for example, a squeal noise).

Accordingly, technology for suppressing and/or eliminating noise generated in vehicles has been developed.

For example, conventionally, a structure of a related system has been changed as a countermeasure against the generation of noise at intermediate-frequencies, and related studies are actively being carried out.

In addition, conventionally, a shim is attached to a brake pad, a brake pad is chamfered, a material of a brake pad is changed, and/or the like as a countermeasure against the generation of high-frequency noise, and related studies are actively being carried out.

However, fewer studies for suppressing and/or eliminating low-frequency noise have been carried out than studies for suppressing and/or eliminating intermediate-frequency noise and high-frequency noise, and as of present, there are no countermeasure to suppress and/or eliminate the corresponding noise.

SUMMARY

Therefore, it is an aspect of the disclosure to provide an assembly for a vehicle driving device capable of suppressing and/or eliminating low-frequency noise generated during travel of a vehicle.

In accordance with one aspect of the present disclosure, an assembly for a vehicle driving device includes a hub configured to rotate about a rotary axis and one or more first fastening members configured to couple the hub and a rim of a wheel for a vehicle, wherein one end portion of the hub includes a first facing surface facing one surface of the rim, wherein the first facing surface includes a portion having an inclination angle with respect to the rotary axis, and the first fastening member is inserted into one portion of the one surface of the rim facing the portion having the inclination angle of the first facing surface and the portion having the inclination angle of the first facing surface in a perpendicular direction to couple the hub and the rim.

The inclination angle may include a first inclination angle, and the one end portion of the hub may include a first portion extending in a first direction perpendicular to the rotary axis and a second portion extending from the first portion in the first direction at the first inclination angle.

The first fastening member may include a first bolt, and the first bolt may be inserted into one portion of the one surface of the rim facing the second portion and the second portion in a perpendicular direction to couple to the hub and the rim.

The inclination angle may include a second inclination angle, the first portion further may include a portion extending in a second direction opposite to the first direction, and the one end portion of the hub may include a third portion extending from the first portion in the second direction at the second inclination angle.

The first fastening member may include a second bolt, and the second bolt is inserted into one portion of one surface of the rim facing the third portion and the third portion in a perpendicular direction to couple the hub and the rim.

The assembly for a vehicle driving device may further include one or more second fastening members configured to couple the hub and a disc of a brake device, wherein the other end portion of the hub may include a second facing surface facing one surface of the disc, the second facing surface may include a portion having an inclination angle with respect to the rotary axis, and the second fastening member may be inserted into one portion of the one surface of the disc facing the portion having the inclination angle of the second facing surface and the portion having the inclination angle of the second facing surface to couple the hub and the disc.

The inclination angle of the second facing surface may include a first inclination angle, and the other end portion of the hub may include a fourth portion extending in a first direction perpendicular to the rotary axis and a fifth portion extending from the fourth portion in the first direction at the first inclination angle.

The second fastening member may include a third bolt, and the third bolt may be inserted into one portion of the disc facing the fifth portion and the fifth portion in a perpendicular direction to couple the disc and the rim.

The inclination angle may include a second inclination angle, the fourth portion may further include a portion extending in a second direction opposite to the first direction, and the other end portion of the hub may include a sixth portion extending from the fourth portion in the second direction at the second inclination angle.

The second fastening member may include a fourth bolt, and the fourth bolt may be inserted into one portion of the one surface of the disc facing the sixth portion and the sixth portion in a perpendicular direction to couple the disc and the rim.

In accordance with another aspect of the present disclosure, an assembly for a vehicle driving device includes a hub configured to rotate about a rotary axis, a wheel coupled one end portion of the hub, and one or more first fastening members, wherein the one end portion of the hub includes a first facing surface facing one surface of the rim, and the first fastening member is inserted into one portion of the one surface of the rim and one portion of the first facing surface to couple the hub and the rim and has a first inclination with respect to the rotary axis.

The first facing surface may include a portion having an inclination angle with respect to the rotary axis, and the first fastening member may be inserted into the one portion of the one surface of the rim facing the portion having the inclination angle of the first facing surface and the portion having the inclination angle of the first facing surface and has the first inclination.

The inclination angle may include a first inclination angle, and the one end portion of the hub may include a first portion extending in a first direction perpendicular to the rotary axis and a second portion extending from the first portion in the first direction at the first inclination angle.

The inclination angle may include a second inclination angle, the first portion may further include a portion extending in a second direction opposite to the first direction, and the one end portion of the hub may include a third portion extending from the first portion in the second direction at the second inclination angle.

The first fastening members may include a first bolt and a second bolt, the first bolt may be inserted into the one portion of one surface of the rim facing the second portion and the second portion in a perpendicular direction, and the second bolt may be inserted into in one portion of the one surface of the rim facing the third portion and the third portion in a perpendicular direction.

The assembly for a vehicle driving device may further include a disc of a brake device coupled to the other end portion of the hub and one or more second fastening members, wherein the other end portion of the hub may include a second facing surface facing one surface of the disc, and the second fastening member may be inserted into one portion of the one surface of the disc and one portion of the second facing surface to couple the hub and the disc and has a second inclination with respect to the rotary axis.

The second facing surface may include a portion having an inclination angle with respect to the rotary axis, and the second fastening member may be inserted into the one portion of the one surface of the disc facing the portion having the inclination angle of the second facing surface and the portion having the inclination angle in a perpendicular direction to have the second inclination angle.

The inclination angle of the second facing surface may include a first inclination angle, and the other end portion of the hub may include a fourth portion extending in a first direction perpendicular to the rotary axis and a fifth portion extending from the fourth portion in the first direction at the first inclination angle.

The inclination angle may include a second inclination angle, the fourth portion may further include a portion extending to in a second direction opposite to the first direction, and the other end portion of the hub may include a sixth portion extending from the fourth portion in the second direction at the second inclination angle.

The second fastening members may include a third bolt and a fourth bolt, the third bolt may be inserted into one portion of the one surface of the disc facing the fifth portion and the fifth portion in a perpendicular direction, and the fourth bolt may be inserted into one portion of the one surface of the disc facing the sixth portion and the sixth portion in a perpendicular direction to couple the disc and the rim.

Materials of the first bolt, the second bolt, the third bolt, and the fourth bolt may be different from a material of the rim.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 is a view illustrating coupling of the axle and the wheel as illustrated in FIG. 1;

DETAILED DESCRIPTION

Figure 1:
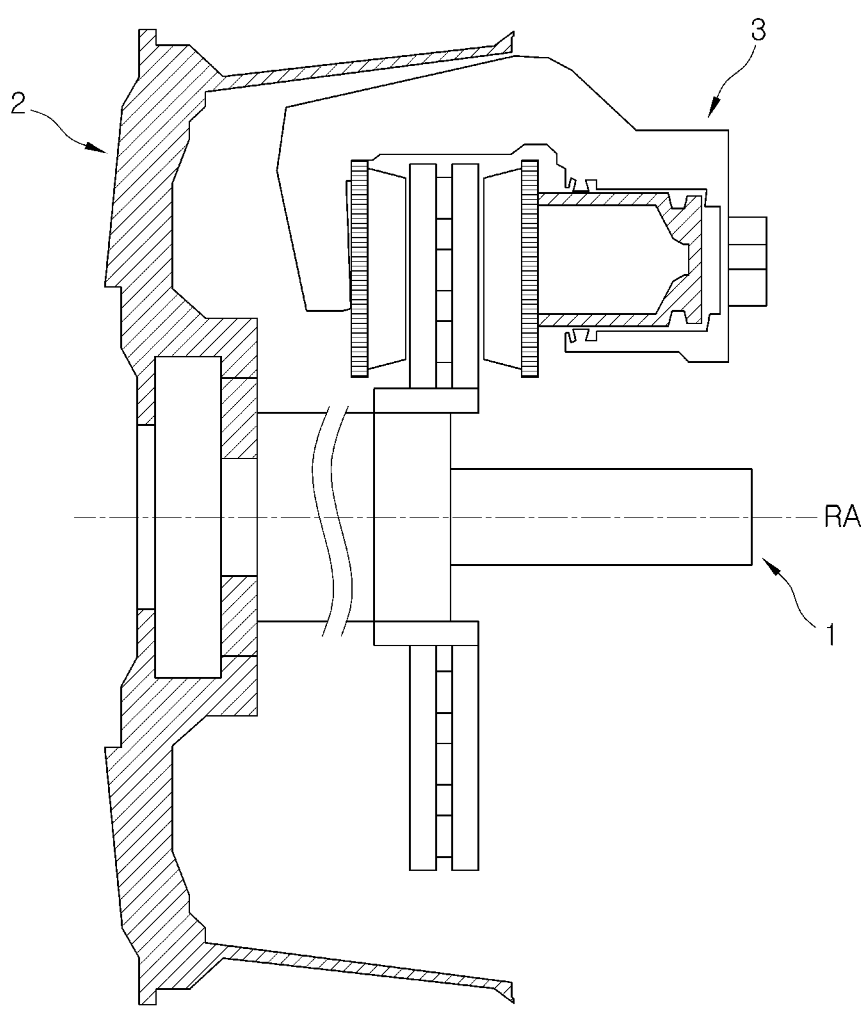
FIG. 1 is a schematic cross-sectional view illustrating an axle, a wheel and a brake device of a conventional vehicle which are coupled.

Like reference numerals denote like elements throughout the specification. In the specification, all elements of the embodiments are not described, and general contents in the art or repeated contents between the embodiments will not be described. Terms such as parts, modules, members, and blocks may be realized using a software or hardware, and a plurality of parts, modules, members, and blocks are realized in a single element, or one part, module, member, or block may also include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Terms such as first, second, and the like are used herein to distinguish one element from another element, and the elements are not limited to the above-described terms.

As used herein, singular forms "a" and "an" are intended to include the plural forms as well, unless the context clearly indicates otherwise.

Reference numerals in operations are used for the sake of convenience in description and do not describe an order of the operations, and the operations may be performed through an order different from the described order unless the context clearly indicates a specific order.

The disclosure is based on a fact that it will be easier to suppress and/or eliminate low-frequency noise generated during travel of a vehicle by changing some configuration (and/or some structure) around an axle of a vehicle rather than changing some configuration (and/or some structure) of a brake device.

Some of the low-frequency noise (for example, a howl noise) generated during the travel of the vehicle may be generated from a rim and/or a disc. Accordingly, when static and dynamic torsion behaviors of the rim and the disc are improved, the low-frequency noise generated during the travel of the vehicle can be suppressed and/or eliminated.

In order to improve the static and dynamic torsion behaviors of the rim and the disc, that is, to increase torsional stiffness of the rim and the disc, bolt circle diameters of the rim and/or the disc need to be large.

Accordingly, in an embodiment of the disclosure, a new assembly for a vehicle driving device in which bolt circle diameters of a rim and/or a disc may be greater than those of the conventional assembly structure is proposed.

Hereinafter, an operational principle and embodiments of the disclosure will be described with reference to the accompanying drawings.

Figure 2:
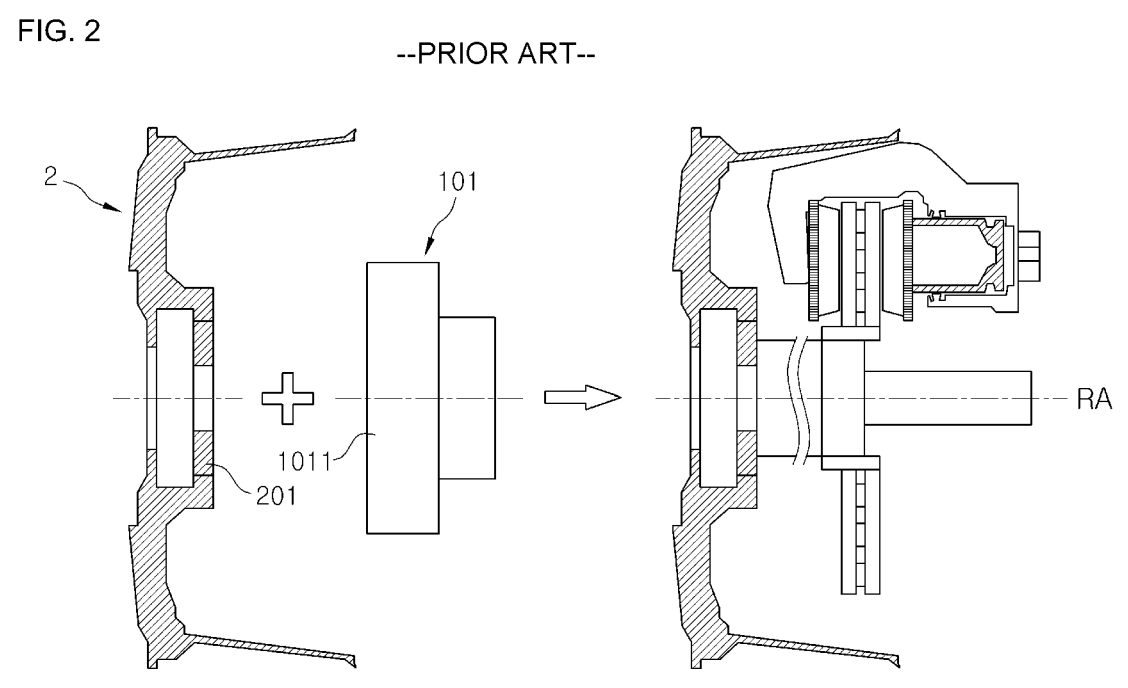
Figure 3:
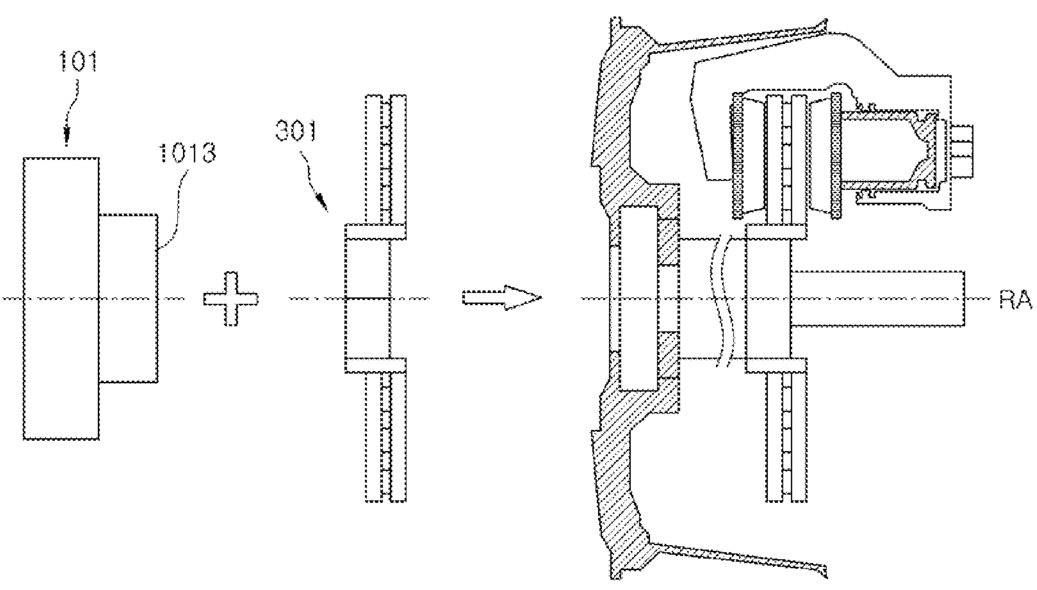
FIG. 3 is a view illustrating coupling of the axle and the brake device as illustrated in FIG. 1.

FIG. 1 is a schematic cross-sectional view illustrating an axle, a wheel and a brake device of a conventional vehicle which are coupled, FIG. 2 is a view illustrating coupling of the axle and the wheel as illustrated in FIG. 1, and FIG. 3 is a view illustrating coupling of the axle and the brake device as illustrated in FIG. 1.

Referring to FIGS. 1, 2, and/or 3, a first surface of an axle 1 and one surface of a wheel 2 may be in contact with each other, and a second surface of the axle 1 and one surface of a brake device 3 may be in contact with each other.

Referring to FIGS. 2 and 3, the axle 1 may include a hub 101.

Referring to FIG. 2, one end portion (or, referred to as a first axial direction outer end portion) 1011 of the hub 101 and a mounting portion 201 of the wheel 2 may be in contact with each other. Accordingly, the hub 101 may rotate about a rotary axis RA while transmitting power provided through the axle 1 to the wheel 2.

Referring to FIG. 3, the other end portion (or, referred to as a second axial direction outer end portion) 1013 of the hub 101 and a disc 301 of the brake device 3 may be in contact with each other. Accordingly, the hub 101 may rotate about the rotary axis RA while transmitting power provided through the axle 1 to the disc 301.

Figure 4:
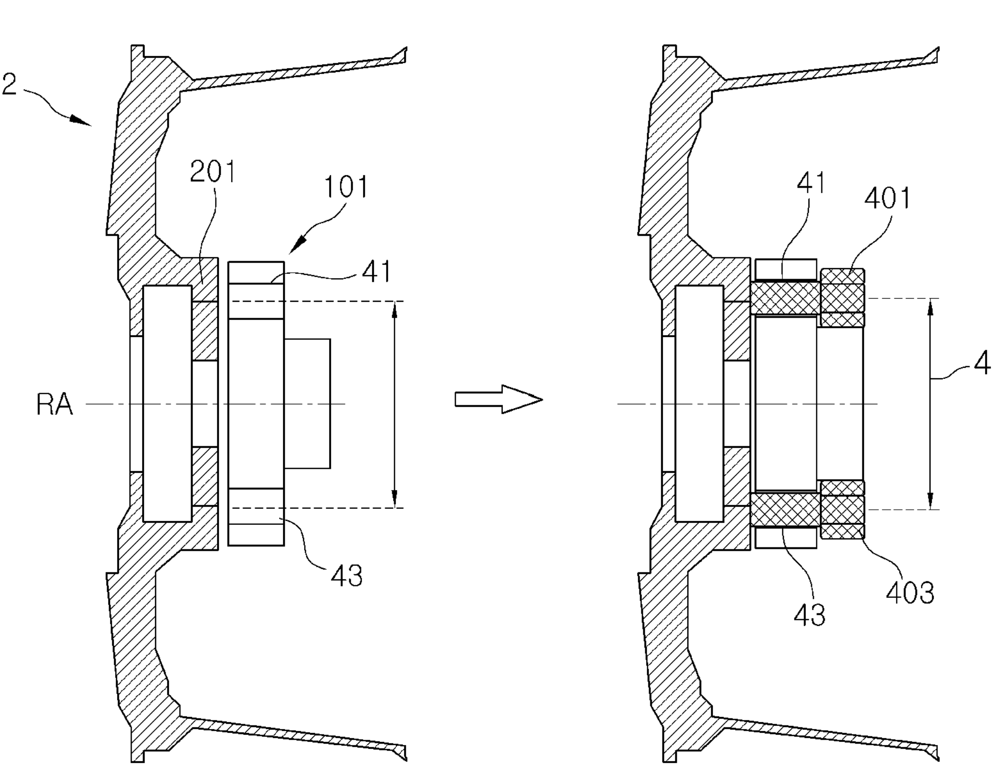
FIG. 4 is a view for describing conventional coupling of a hub and a mounting portion of a wheel using a bolt.

FIG. 4 is a view for describing conventional coupling of the hub and the mounting portion of a wheel using a bolt.

Referring to FIG. 4, through holes 41 and 43 are formed in two end portions of the hub 101 disposed in a direction perpendicular to the rotary axis RA. The through holes 41 and 43 are formed in end portions of the hub 101 to be parallel to the rotary axis RA. In addition, a bolt 401 is inserted into the through hole 41, and a bolt 403 is inserted into the through hole 43 so that the mounting portion 201 of the wheel 2 and the hub 101 are coupled using the bolt 401 and the bolt 403.

According to a conventional coupling structure of the mounting portion 201 and the hub 101 as illustrated in FIG. 4, there has been a problem that low-frequency noise is generated during travel of the vehicle.

Accordingly, in an embodiment of the present disclosure, in order to suppress and/or eliminate low-frequency noise, a new coupling structure, that is, assembly structure, in which a bolt circle diameter 4 of the through hole 43 is increased, is proposed to increase a torsion eigen frequency of the mounting portion 201.

Figure 5:
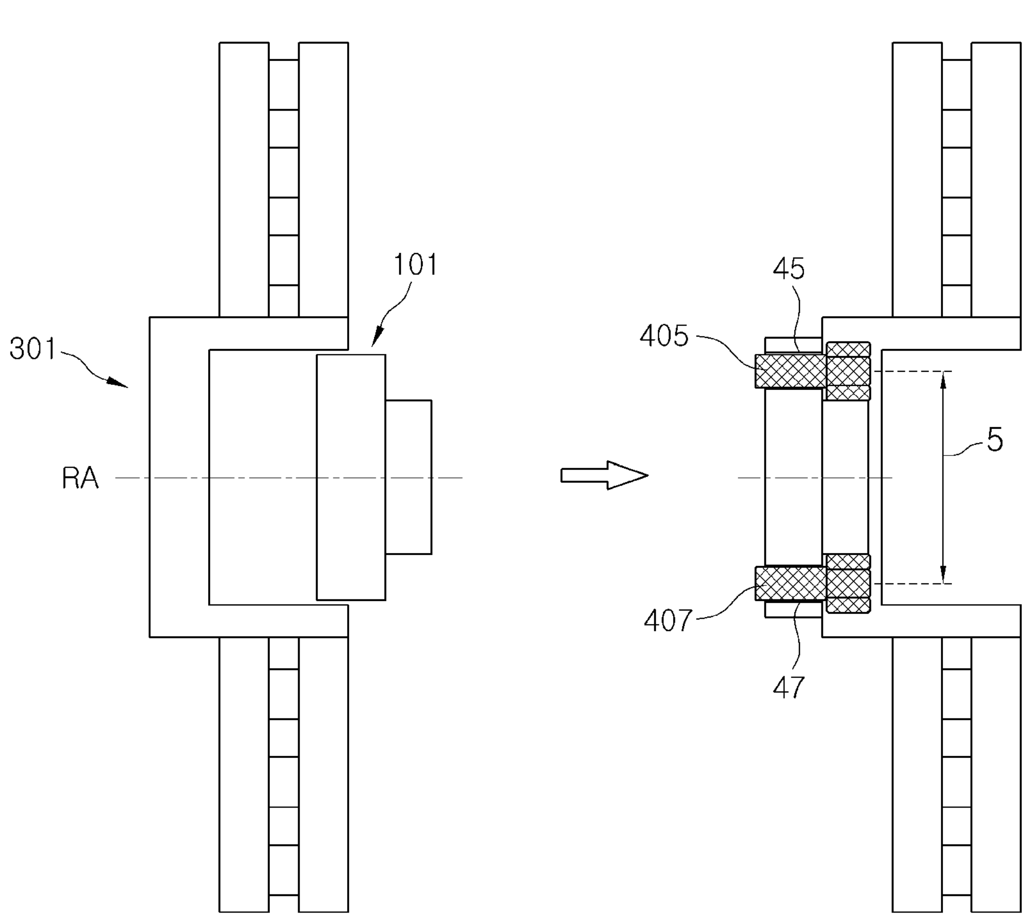
FIG. 5 is a view for illustrating conventional coupling of the hub and the disc using a bolt.

FIG. 5 is a view for illustrating conventional coupling of a hub and a disc using the bolt.

Referring to FIG. 5, conventionally, through holes 45 and 47 are formed in two end portions of the hub 101 in a direction perpendicular to the rotary axis RA and portions of the disc 301 in contact with the two end portions. In addition, the through holes 45 and 47 are formed to be parallel to the rotary axis RA in the two end portions of the hub 101 and the portions of the disc 301 in contact with the two end portions. In addition, a bolt 405 is inserted into the through hole 45 and a bolt 407 is inserted into the through hole 47 so that the disc 301 and the hub 101 of the brake device 3 are coupled using the bolt 405 and the bolt 407.

According to the conventional coupling structure of the disc 301 and the hub 101 as illustrated in FIG. 5, there has been a problem that low-frequency noise is generated during travel of the vehicle.

Accordingly, in an embodiment of the present disclosure, in order to suppress and/or eliminate low-frequency noise, a new coupling structure, that is, an assembly structure, in which a bolt circle diameter 5 is increased, is proposed to increase a torsion eigen frequency of the disc 301 of the brake device 3.

Figure 6:
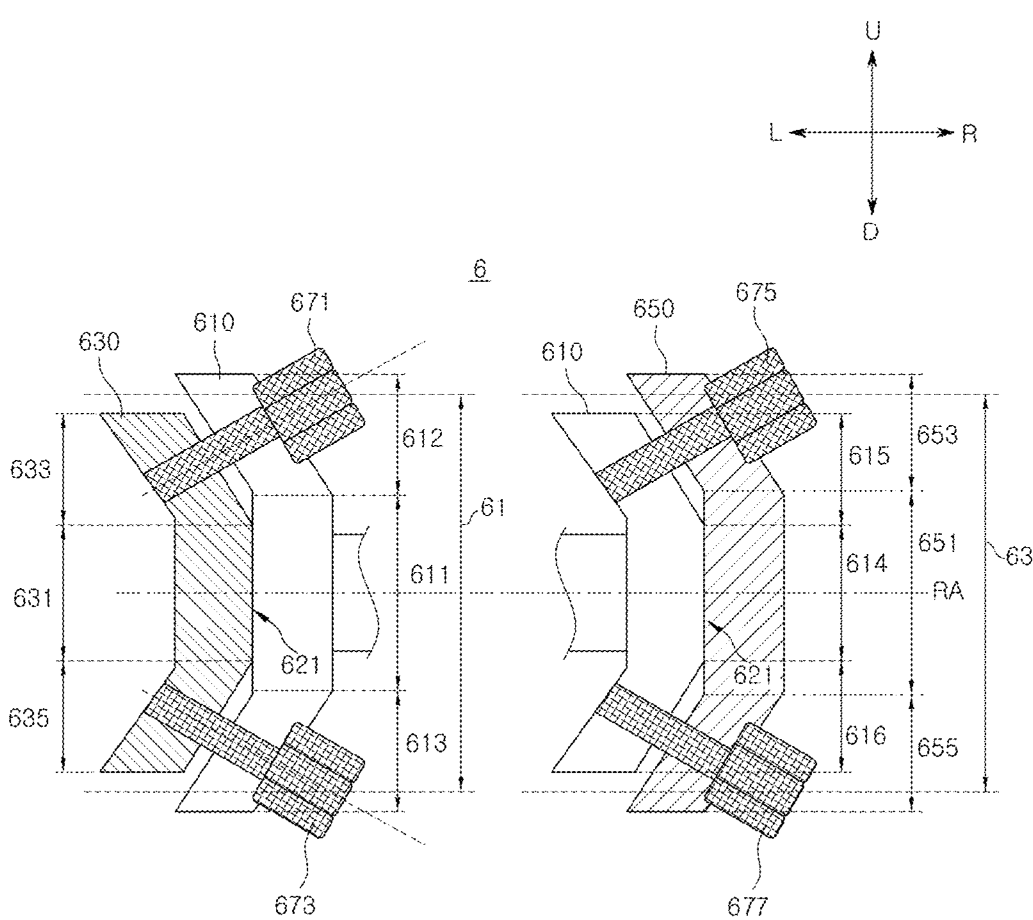
FIG. 6 is a schematic cross-sectional view illustrating an assembly of a vehicle driving device including a hub, a mounting portion of a wheel, and a disc according to one embodiment.

FIG. 6 is a schematic cross-sectional view illustrating an assembly of a vehicle driving device 6 including a hub, a mounting portion of a wheel, and a disc according to one embodiment.

Referring to FIG. 6, an end portion (or, referred to as one surface in a first outer axial direction L) of a hub 610 disposed in one direction L may include a facing surface (or, referred to as a first facing surface) facing one surface of a mounting portion 630 of a wheel. In addition, the facing surface may include portions having inclination angles with respect to a rotary axis RA.

For example, the facing surface may include a first portion 611, a second portion 612, and/or a third portion 613, and the portions having the inclination angles may correspond to the second portion 612 and the third portion 613.

A first bolt 671 corresponding to a first fastening member may be inserted into one portion of one surface of the mounting portion 630 facing the second portion 612 of the hub 610, that is, a second portion 633, and the second portion 612.

A second bolt 673 corresponding to a first fastening member may be inserted into one portion of one surface of the mounting portion facing the third portion 613 of the hub 610, that is, a third portion 635, and the third portion 613.

Then, the first fastening member (the first bolt 671 and/or the second bolt 673) may have an inclination (referred to as a first inclination) with respect to the rotary axis RA. In other words, the first fastening member (the first bolt 671 and/or the second bolt 673) may be disposed not parallel to the rotary axis RA.

An end portion (also referred to as one surface of a second outer axial direction R) of the hub 610 disposed in the other direction R may include a facing surface (referred to as a second facing surface) facing one surface of a disc 650. In addition, the facing surface may include portions having inclination angles with respect to the rotary axis RA.

For example, the facing surface may include a fourth portion 614, a fifth portion 615, and/or a sixth portion 616, and the portions having the inclination angles may correspond to the fifth portion 615 and the sixth portion 616.

A third bolt 675 corresponding to a second fastening member may be inserted into one portion of one surface of the disc 650 facing the fifth portion 615 of the hub 610, that is, a second portion 653, and the fifth portion 615.

A fourth bolt 677 corresponding to a second fastening member may be inserted into one portion of one surface of the disc 650 facing the sixth portion 616 of the hub 610, that is, a third portion 655, and the sixth portion 616.

Then, the second fastening member (the third bolt 675 and/or the second bolt 677) may have an inclination (referred to as a second inclination) with respect to the rotary axis RA. In other words, the second fastening member (the third bolt 675 and/or the fourth bolt 677) may be disposed not parallel to the rotary axis RA.

More specifically, the end portion of the hub 610 disposed in one direction L may include the first portion 611 extending around the rotary axis RA in a first direction U perpendicular to the rotary axis RA and a second direction D opposite to the first direction U.

In addition, the end portion of the hub 610 disposed in one direction L may include the second portion 612 extending from the first portion 611 at a predetermined first inclination angle and the third portion 613 extending from the first portion 611 at a predetermined second inclination angle.

The predetermined first inclination angle may be an angle greater than 90 degrees, and the second inclination angle may be an angle greater than 180 degrees.

The mounting portion 630 may include a first portion 631 extending around the rotary axis RA in the first direction U and the second direction D which are perpendicular the rotary axis RA. In addition, the mounting portion 630 may include a second portion 633 extending from the first portion 631 at a predetermined third inclination angle, and a third portion 635 extending from the first portion 631 at a predetermined fourth inclination angle.

The predetermined third inclination angle may be an angle greater than 90 degrees, and the fourth inclination angle may be an angle greater than 180 degrees. For example, the third inclination angle may be the same as the first inclination angle, and the fourth inclination angle may be the same as the second inclination angle.

The first portion 611 of the hub 610 may be formed to have a length greater than a length of the first portion 631 of the mounting portion 630, and a first axial direction outer end portion 621 of the hub 610 may be in contact with one surface of the first portion 631 of the mounting portion 630. Accordingly, an empty region having a predetermined gap may be formed between the second portion 612 of the hub 610 and the second portion 633 of the mounting portion 630. In addition, an empty region having a predetermined gap may be formed between the third portion 613 of the hub 610 and the third portion 635 of the mounting portion 630.

Through holes through which the first bolt 671 may pass may be formed in the second portion 633 of the mounting portion 630 and the second portion 612 of the hub 610, respectively. For example, the through holes of the second portion 633 of the mounting portion 630 and the second portion 612 of the hub 610 may be formed to be straightly colinear with each other to be perpendicular to a longitudinal direction of each of the second portion 633 and the second portion 612.

The bolt 671 may be inserted into the through holes of the second portion 633 of the mounting portion 630 and the second portion 612 of the hub 610 to couple the mounting portion 630 and the hub 610.

Through holes through which the second bolt 673 may pass may be formed in the third portion 635 of the mounting portion 630 and the third portion 613 of the hub 610, respectively. For example, the through holes of the third portion 635 of the mounting portion 630 and the third portion 613 of the hub 610 may be formed to be straightly colinear with each other to be perpendicular to a longitudinal direction of each of the third portion 635 and the third portion 613.

The second bolt 673 may be inserted into the through holes of the third portion 635 of the mounting portion 630 and the third portion 613 of the hub 610 to couple the mounting portion 630 and the hub 610.

According to a coupling structure of the hub 610 and the mounting portion 630 described above, it may be seen that each of the bolts 671 and 673 has a predetermined angle (or, referred to as a predetermined inclination) with respect to the rotary axis RA.

Accordingly, when compared to the conventional hub and mounting portion coupling structure as illustrated in FIG. 4, a distance between the bolts 671 and 673, that is, a bolt circle diameter 61, becomes larger, and thus a torsional stiffness of the mounting portion 630 can increase.

In addition, the end portion of the hub 610 disposed in the other direction R opposite to the end portion in one direction L may include the fourth portion 614 extending around the rotary axis RA in the first direction U and the second direction D which are perpendicular to the rotary axis RA.

In addition, the end portion of the hub 610 disposed in the other direction R may include the fifth portion 615 extending from the fourth portion 614 at a predetermined fifth inclination angle and the fifth portion 615 extending from the fourth portion 614 at a predetermined sixth inclination angle.

The predetermined fifth inclination angle may be an angle greater than 90 degrees, and the sixth inclination angle may be an angle greater than 180 degrees.

The disc 650 may include a first portion 651 extending around the rotary axis RA in the first direction U perpendicular to the rotary axis RA and the second direction D opposite the first direction U. In addition, the disc 650 may include a second portion 653 extending from the first portion 651 at a predetermined seventh inclination angle and a third portion 655 extending from the first portion 651 at a predetermined eighth inclination angle.

The predetermined seventh inclination angle may be an angle greater than 90 degrees, and the eighth inclination angle may be an angle greater than 180 degrees. For example, the seventh inclination angle may be the same as the fifth inclination angle, and the eighth inclination angle may be the same as the sixth inclination angle.

The fourth portion 614 of the hub 610 may be formed to have a length smaller than a length of the first portion 651 of the disc 650, and a second axial direction outer end portion 624 of the hub 610 may be in contact with one surface of the first portion 651 of the disc 650. Accordingly, an empty region having a predetermined gap may be formed between the fifth portion 615 of the hub 610 and the second portion 653 of the mounting portion 630. In addition, an empty region having a predetermined gap may be formed between the sixth portion 616 of the hub 610 and the third portion 655 of the disc 650.

Through holes through which the third bolt 675 may pass may be formed in the second portion 653 of the disc 650 and the fifth portion 615 of the hub 610, respectively. For example, through holes of the second portion 653 of the disc 650 and the fifth portion 615 of the hub 610 may be formed to be straightly colinear with each other to be perpendicular to a longitudinal direction of each of the second portion 653 and the fifth portion 615.

The third bolt 675 may be inserted into the through hole of the second portion 653 of the disc 650 of the mounting portion 630 and the through holes of the fifth portion 615 of the hub 610 to couple the disc 650 and the hub 610.

Through holes through which one fourth bolt 677 may pass may be formed in the third portion 655 of the disc 650 and the sixth portion 616 of the hub 610. For example, the through holes of the third portion 655 of the disc 650 and the sixth portion 616 of the hub 610 may be formed to be colinear with each other to be perpendicular to a longitudinal direction of each of the third portion 655 and the sixth portion 616.

The fourth bolt 677 may be inserted into the through holes of the third portion 655 of the disc 650 and the sixth portion 616 of the hub 610 to couple the mounting portion 630 and the disc 650.

According to the coupling structure of the hub 610 and the disc 650 described above, it may be seen that each of the bolt 675 and 677 has a predetermined angle (or, referred to as a predetermined inclination) with respect to the rotary axis RA.

Accordingly, when compared to the conventional hub and disc coupling structure as illustrated in FIG. 5, a distance between the bolts 675 and 677, that is, a bolt circle diameter 63, becomes larger, and thus a torsional stiffness of the disc 650 can increase.

Figure 7:
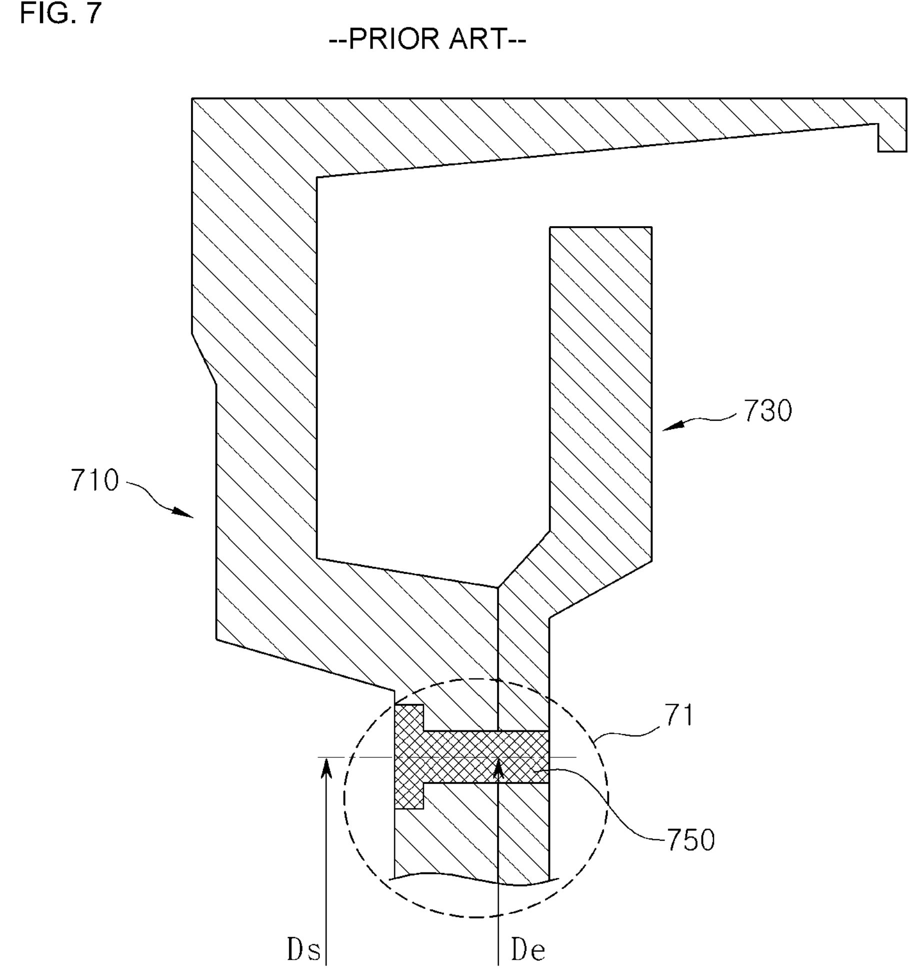
FIG. 7 is a schematic cross-sectional view illustrating a conventional assembly structure of the mounting portion of a wheel and the disc.

FIG. 7 is a schematic cross-sectional view illustrating the conventional assembly structure of the mounting portion and the disc.

Referring to FIG. 7, in the conventional structure, one surface of the mounting portion 710 of a wheel and one surface of the disc 730 are in contact with each other and coupled to each other using a bolt 750. For example, conventionally, through holes are formed to be straightly colinear with each other to be perpendicular to one surface of the mounting portion 710 and one surface of the disc 730, and the bolt 750 is inserted into the through holes to couple the mounting portion 710 and the disc 730.

According to a coupling structure of FIG. 7, a first distance Ds from any one portion of a lower end of one surface of the mounting portion 710 and one surface of the disc 730 to a head center of the bolt 750 and a second distance De from the any one portion of the lower end of one surface of the mounting portion 710 and one surface of the disc 730 to a center of a body of the bolt 750 are the same. Accordingly, a vehicle having the corresponding structure has a problem that low-frequency noise is generated during travel.

Figure 8:
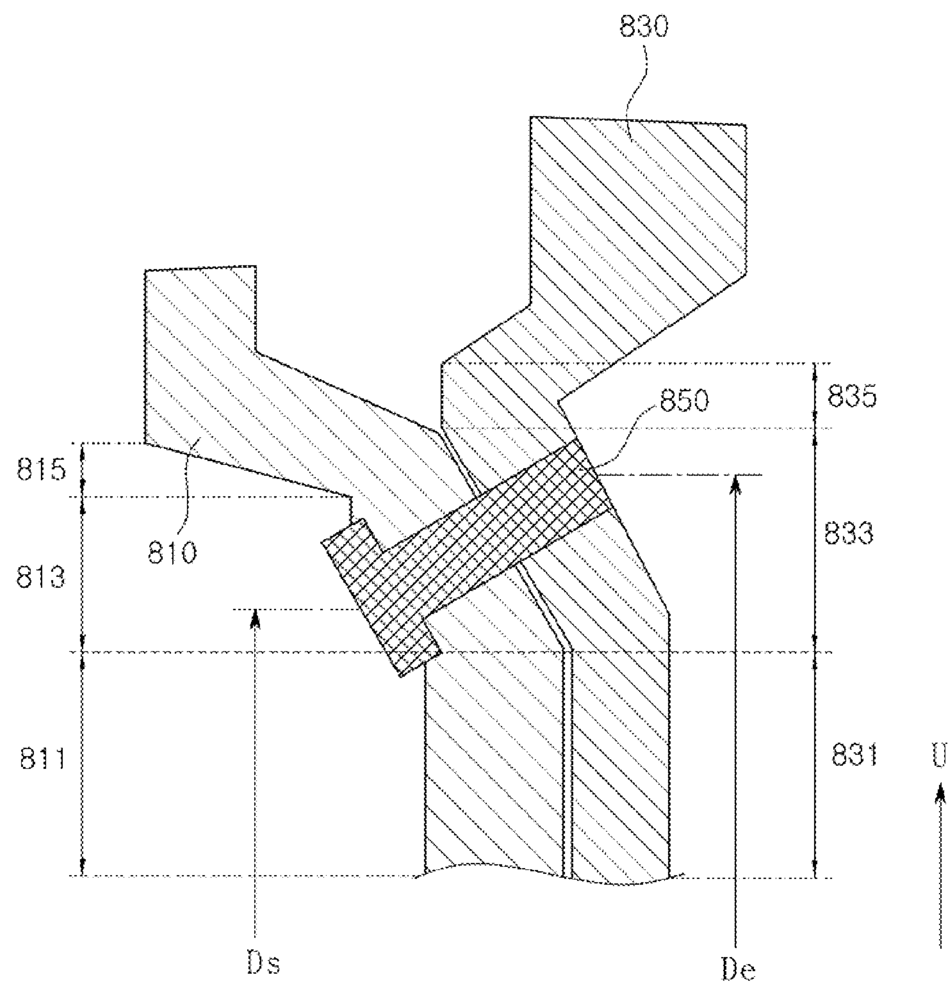
FIG. 8 is a schematic cross-sectional view illustrating an assembly structure of a mounting portion of a wheel and a disc according to one embodiment.

In order to suppress and/or eliminate the low-frequency noise generated according to the coupling structure as illustrated in FIG. 7, an embodiment of the present disclosure proposes to change a structure of portion 71 of FIG. 7 so that a first distance Ds and a second distance De should be different as illustrated in FIG. 8.

FIG. 8 is a schematic cross-sectional view illustrating an assembly structure of a mounting portion of a wheel and a disc according to one embodiment.

Referring to FIG. 8, a mounting portion 810 of a wheel may include a first portion 811 extending in a vertical direction U of a coordinate system, a second portion 813 extending from the first portion 811 at a predetermined first inclination angle, and a third portion 815 extending from the second portion 813 at a predetermined second inclination angle.

For example, the predetermined first inclination angle may be an angle greater than 90 degrees and may be smaller than the predetermined second inclination angle.

In addition, the disc 830 may include a first portion 831 extending in the vertical direction U of the coordinate system, a second portion 833 extending from the first portion 831 at a predetermined third inclination angle, and a third portion 835 extending from the second portion 833 at a predetermined fourth inclination angle.

For example, the predetermined third inclination angle may be the same angle as the predetermined first inclination angle and may be greater than the predetermined fourth inclination angle.

One surface of the first portion 811 of the mounting portion 810 and one surface of the first portion 831 of the disc 830 may be in contact with each other, and one surface of the second portion 813 of the mounting portion 810 and one surface of the second portion 833 of the disc 830 may be in contact with each other. In addition, the third portion 815 of the mounting portion 810 and the third portion 835 of the disc 830 may not be in contact with each other.

Through holes may be formed in the second portion 813 of the mounting portion 810 and the second portion 833 of the disc 830. For example, the through holes of the second portion 813 of the mounting portion 810 and the second portion 813 of the disc 830 may be formed to be straightly colinear with each other to be perpendicular to a longitudinal direction of each of the second portion 813 and the second portion 813.

A fastening member 850 (for example, a bolt) may be inserted into the through holes to couple the second portion 813 of the mounting portion 810 and the second portion 813 of the disc 830 using the fastening member 850.

According to the new coupling structure of FIG. 8, it may be seen that a second distance De from any one portion of a lower end of one surface of the mounting portion 810 and one surface of the disc 830 to a center of a body of the fastening member 850 is greater than a first distance Ds from the any one portion of the lower end of one surface of the mounting portion 810 and one surface of the disc 830 to a head center of the fastening member 850. This increases a torsional stiffness of the mounting portion 810 and/or the disc 830 compared to the conventional coupling structure of the mounting portion 710 and disc 730 as illustrated in FIG. 7, and thus there is an advantage of minimizing or eliminating low-frequency noise.

According to one aspect of the disclosed disclosure, an assembly for a vehicle driving device can suppress and/or eliminate low-frequency noise generated during travel of a vehicle.

For example, the assembly for a vehicle driving device according to one aspect of the disclosed disclosure can provide a new assembly capable of minimizing low-frequency noise generated from the assembly of a hub of a conventional axle, a disc of a brake device, and a wheel.

The disclosed embodiments have been described with reference to the accompanying drawings as described above. It may be understood by those skilled in the art that the disclosure may be performed in other concrete forms without changing the technological scope and essential features. The disclosed embodiments are exemplary and should not be interpreted as purposes of limitation.

What is claimed is:

1. An assembly for a vehicle driving device, the assembly comprising:

a hub connected to an axle and rotatable about a rotary axis by power provided through the axle; and a first fastening member inserted through the hub and a mounting portion of a wheel for a vehicle to couple the hub and the mounting portion, wherein one end portion of the hub includes a first facing surface facing one surface of the mounting portion, wherein the first facing surface includes a portion having an inclination angle with respect to the rotary axis, and the first fastening member is inserted into one portion of the one surface of the mounting portion facing the portion having the inclination angle of the first facing surface and the portion having the inclination angle of the first facing surface in a perpendicular direction to couple the hub and the mounting portion.

2. The assembly of claim 1, wherein:

the inclination angle includes a first inclination angle; and the one end portion of the hub includes a first portion extending in a first direction perpendicular to the rotary axis and a second portion extending from the first portion in the first direction at the first inclination angle.

3. The assembly of claim 2, wherein:

the first fastening member includes a first bolt; and the first bolt is inserted into one portion of the one surface of the mounting portion facing the second portion and the second portion in a perpendicular direction to couple to the hub and the mounting portion.

4. The assembly of claim 2, wherein:

the inclination angle includes a second inclination angle;

the first portion further includes a portion extending in a second direction opposite to the first direction; and the one end portion of the hub includes a third portion extending from the first portion in the second direction at the second inclination angle.

5. The assembly of claim 4, wherein:

the first fastening member includes a second bolt; and the second bolt is inserted into one portion of one surface of the mounting portion facing the third portion and the third portion in a perpendicular direction to couple the hub and the mounting portion.

6. The assembly of claim 1, further comprising a second fastening member configured to couple the hub and a disc of a brake device, wherein the other end portion of the hub includes a second facing surface facing one surface of the disc, the second facing surface includes a portion having an inclination angle with respect to the rotary axis, and the second fastening member is inserted into one portion of the one surface of the disc facing the portion having the inclination angle of the second facing surface and the portion having the inclination angle of the second facing surface to couple the hub and the disc.

7. The assembly of claim 6, wherein:

the inclination angle of the second facing surface includes a first inclination angle; and the other end portion of the hub includes a fourth portion extending in a first direction perpendicular to the rotary axis and a fifth portion extending from the fourth portion in the first direction at the first inclination angle.

8. The assembly of claim 7, wherein:

the second fastening member includes a third bolt; and the third bolt is inserted into one portion of the disc facing the fifth portion and the fifth portion in a perpendicular direction to couple the disc and the mounting portion.

9. The assembly of claim 8, wherein:

the inclination angle includes a second inclination angle;

the fourth portion further includes a portion extending in a second direction opposite to the first direction; and the other end portion of the hub includes a sixth portion extending from the fourth portion in the second direction at the second inclination angle.

10. The assembly of claim 9, wherein:

the second fastening member includes a fourth bolt; and the fourth bolt is inserted into one portion of the one surface of the disc facing the sixth portion and the sixth portion in a perpendicular direction to couple the disc and the mounting portion.

11. An assembly for a vehicle driving device, the assembly comprising:

a hub connected to an axle and rotatable about a rotary axis by power provided through the axle;

a wheel coupled to one end portion of the hub; and a first fastening member, wherein the one end portion of the hub includes a first facing surface facing one surface of a mounting portion, and the first fastening member is inserted into one portion of the one surface of the mounting portion and one portion of the first facing surface to couple the hub and the mounting portion and has a first inclination with respect to the rotary axis.

12. The assembly of claim 11, wherein:

the first facing surface includes a portion having an inclination angle with respect to the rotary axis; and the first fastening member is inserted into the one portion of the one surface of the mounting portion facing the portion having the inclination angle of the first facing surface and the portion having the inclination angle of the first facing surface and has the first inclination.

13. The assembly of claim 12, wherein:

the inclination angle includes a first inclination angle; and the one end portion of the hub includes a first portion extending in a first direction perpendicular to the rotary axis and a second portion extending from the first portion in the first direction at the first inclination angle.

14. The assembly of claim 13, wherein:

the inclination angle includes a second inclination angle;

the first portion further includes a portion extending in a second direction opposite to the first direction; and the one end portion of the hub includes a third portion extending from the first portion in the second direction at the second inclination angle.

15. The assembly of claim 14, wherein:

the first fastening member includes a first bolt and a second bolt;

the first bolt is inserted into the one portion of one surface of the mounting portion facing the second portion and the second portion in a perpendicular direction; and the second bolt is inserted into in one portion of the one surface of the mounting portion facing the third portion and the third portion in a perpendicular direction.

16. The assembly of claim 15, further comprising a disc of a brake device coupled to the other end portion of the hub; and a second fastening member, wherein the other end portion of the hub includes a second facing surface facing one surface of the disc, and the second fastening member is inserted into one portion of the one surface of the disc and one portion of the second facing surface to couple the hub and the disc and has a second inclination with respect to the rotary axis.

17. The assembly of claim 16, wherein:

the second facing surface includes a portion having an inclination angle with respect to the rotary axis; and the second fastening member is inserted into the one portion of the one surface of the disc facing the portion having the inclination angle of the second facing surface and the portion having the inclination angle in a perpendicular direction to have the second inclination angle.

18. The assembly of claim 17, wherein:

the inclination angle of the second facing surface includes a first inclination angle; and the other end portion of the hub includes a fourth portion extending in a first direction perpendicular to the rotary axis and a fifth portion extending from the fourth portion in the first direction at the first inclination angle.

19. The assembly of claim 18, wherein:

the inclination angle includes a second inclination angle;

the fourth portion further includes a portion extending to in a second direction opposite to the first direction; and the other end portion of the hub includes a sixth portion extending from the fourth portion in the second direction at the second inclination angle.

20. The assembly of claim 19, wherein:

the second fastening member include a third bolt and a fourth bolt;

the third bolt is inserted into one portion of the one surface of the disc facing the fifth portion and the fifth portion in a perpendicular direction; and the fourth bolt is inserted into one portion of the one surface of the disc facing the sixth portion and the sixth portion in a perpendicular direction to couple the disc and the mounting portion, and wherein: materials of the first bolt, the second bolt, the third bolt, and the fourth bolt are different from a material of the mounting portion.

* * * * *